J. SCHIRRA.
HEADLIGHT DIMMER.
APPLICATION FILED NOV. 7, 1919.
1,354,695.
Patented Oct. 5, 1920.
2 SHEETS—SHEET 2.
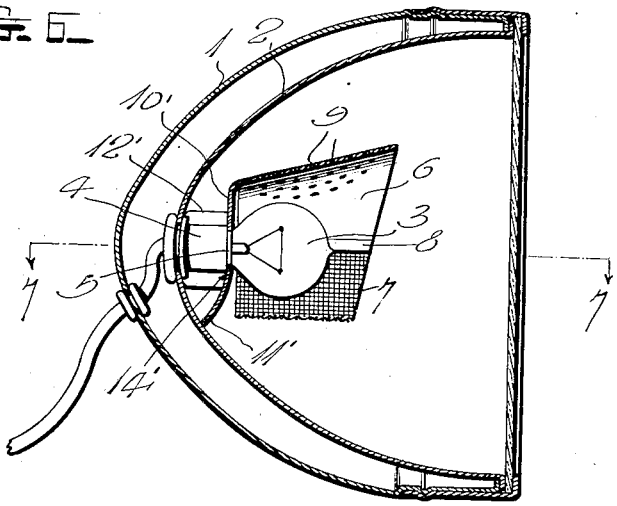
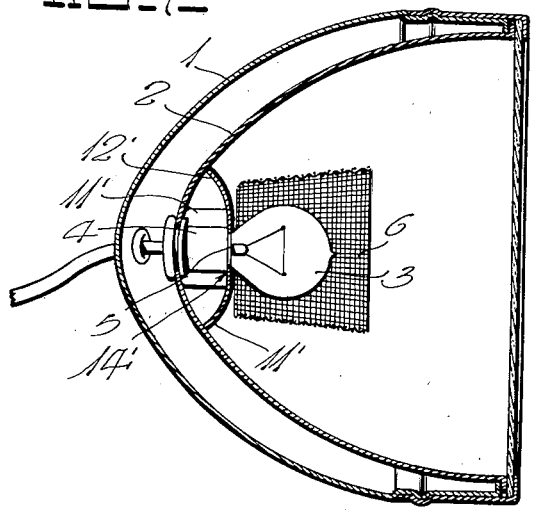
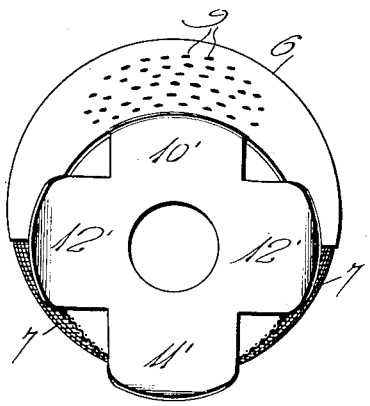
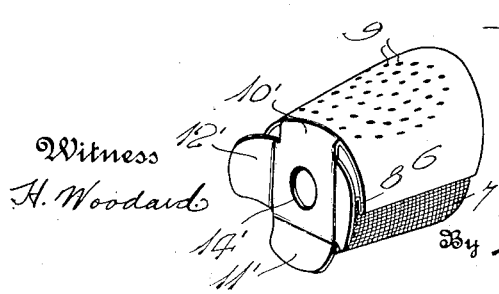
Witness
H. Woodard
Inventor
Julius Schirra,
By H. B. Willson & Co.
Attorneys

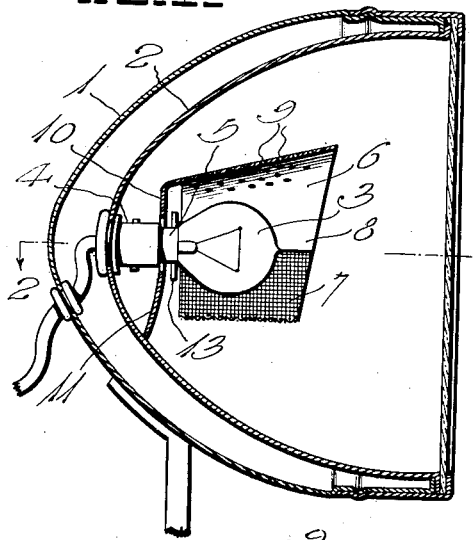
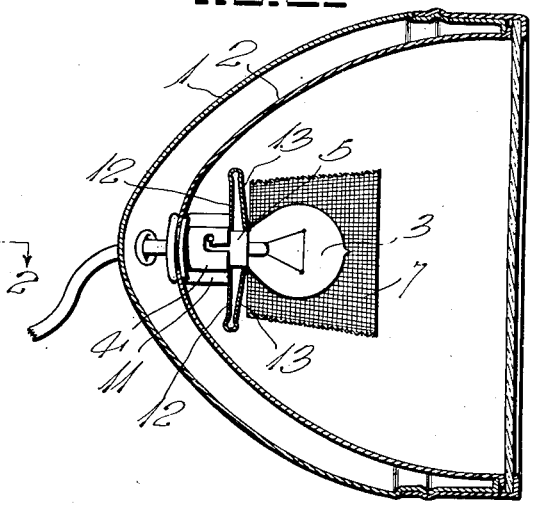
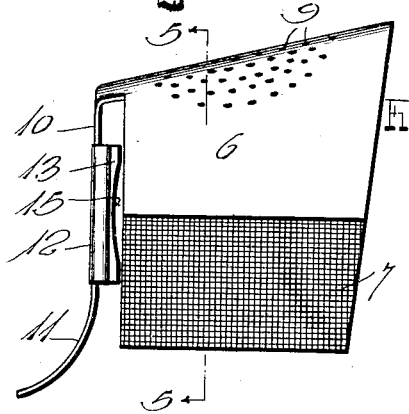
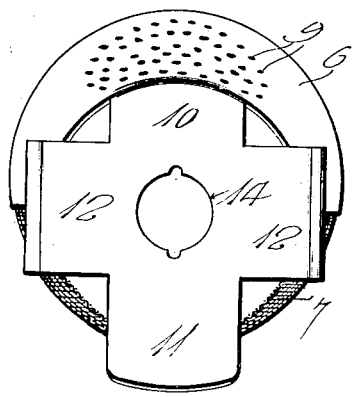
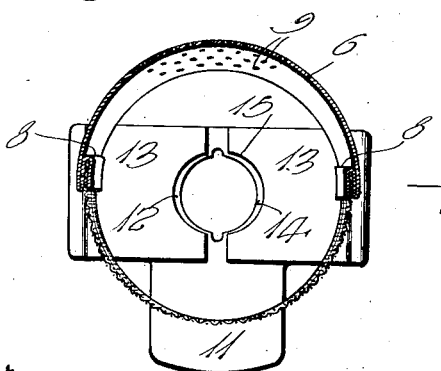

UNITED STATES PATENT OFFICE.

JULIUS SCHIRRA, OF PITTSBURGH, PENNSYLVANIA.

HEADLIGHT-DIMMER.

1,354,695.  Specification of Letters Patent.  Patented Oct. 5, 1920.

Application filed November 7, 1919. Serial No. 336,313.

*To all whom it may concern:*

Be it known that I, JULIUS SCHIRRA, a citizen of the United States, residing at Pittsburgh, in the county of Allegheny and State of Pennsylvania, have invented certain new and useful Improvements in Headlight-Dimmers; and I do declare the following to be a full, clear, and exact description of the invention, such as will enable others skilled in the art to which it appertains to make and use the same.

This invention relates generally to headlights for motor vehicles, but more particularly to dimmers for motor vehicle headlights.

The principal object of the invention is to provide a motor vehicle headlight in which the light is diffused at its source before reaching the reflector so that a natural light will be projected from the headlight without the usual glare and blinding effect upon persons facing the light.

Another object of the invention is to provide a device capable of diffusing the light of a motor vehicle headlight at its source and provided with means whereby it may be easily and readily attached to a headlight without first specially constructing the headlight for the attachment of the device thereto.

An additional object of the invention is to provide means whereby a headlight dimmer of this character may be prevented from unduly vibrating when the motor vehicle on which the headlight is carried is in motion, and by which it is prevented from becoming displaced with respect to the various parts of the headlight.

A still further object of the invention is to generally improve upon devices of this character by the provision of a simple, strong, durable and inexpensive construction, one which will be efficient and reliable in operation, and well adapted to the purpose for which it is designed.

With these and other objects in view, the invention consists of the novel features of construction, and the combination and arrangement of parts as will be hereinafter fully described and claimed.

In the accompanying drawings forming a part of the specification,

Figure 1 is a vertical longitudinal sectional view through a headlight equipped with a device constructed in accordance with this invention.

Fig. 2 is a horizontal sectional view through the headlight taken on the plane indicated by the line 2—2 of Fig. 1.

Fig. 3 is an enlarged side elevation of the device detached from the headlight.

Fig. 4 is a view of the rear end of the device detached from the headlight.

Fig. 5 is a transverse sectional view of the device taken on the plane indicated by the line 5—5 of Fig. 3.

Fig. 6 is a view similar to Fig. 1, showing a modified form of the device attached to the headlight.

Fig. 7 is a view similar to Fig. 2 taken on the plane indicated by the line 7—7 of Fig. 6.

Fig. 8 is a view of the rear end of the modified form of the device detached from the headlight, and Fig. 9 is a perspective view of the modified form.

Referring more particularly to the drawings, the numeral 1 designates a headlight having disposed therein a parabolical reflector 2 and an electric bulb 3 detachably fitted in a socket 4 carried at the rear end of the reflector. These parts are of the ordinary form and hence comprise no part of the present invention. The bulb 3 as shown in Figs. 1 and 2 of the drawings has a comparatively long shank 5 so that the beginning of the bulge of the bulb from its shank is disposed a slight distance in advance of the forward end of the socket 4.

One form of the device is shown in Figs. 1 to 5, and this comprises a cup-shaped member formed of two sections 6 and 7, the upper section 6 being substantially semi-cylindrical in shape and being made of sheet material preferably thin sheet metal, while the lower section 7 is also substantially semi-cylindrical in shape but is of foraminous material, preferably wire gauze or screen. The edges of the lower screen 7 are clamped between crimped portions 8 arranged at the edges of the upper section 6, whereby to secure the two sections together. This construction is clearly shown in Fig. 5.

The upper section 6 is preferably provided with a plurality of apertures 9, but it is to be understood that these may be omitted, if desired.

Formed integrally with the upper section 6 and extending downwardly therefrom across the rear end of the device is a tongue 10, the lower end of which is curved rearwardly as at 11. Extending laterally from opposite edges of the tongue 10 at portions substantially midway of the ends of the same are wings 12, the free ends of which are bent inwardly upon themselves as at 13. The tongue 10 and wings 12, especially their free ends or portions 13 are resilient so that when pressure is applied to the free end of the tongue, it will bend the required amount, and likewise when pressure is applied to the portions 13 of the wings they will be pressed inwardly toward the main portions of the latter.

The tongue 10 is provided at a point centrally of itself and of the wings 12 with an opening 14, and the free ends of the portions 13 of the wings 12 are provided with semi-circular recesses or bights 15 which are disposed substantially in alinement with the opening 14. The curvature of the recesses 15 is substantially the same as the curvature of the opposite sides of the opening 14, but owing to the fact that the portions 13 are normally disposed angularly with respect to the wings 12, the opening formed by the recesses 15 appears to be larger in diameter than the opening 14.

In using the device, the bulb 3 is disconnected from the socket 4 and the shank 5 is extended through the opening formed by the recesses 15 and through the opening 14 in the tongue 10. The shank of the bulb is then inserted in the socket 4 as far as it will go and then turned to effect a connection with the same. The rear portion of the bulb 3 contacting with the springy or resilient portions 13 of the wings 12 forces the same inwardly causing the edges of the recesses 15 to engage the opposite sides of the shank 5 of the bulb with the same. The main portions of the wings 12 and the tongue 10 are thus maintained tightly against the forward end of the socket 4. The free end 11 of the tongue 10 contacts with the reflector 2 and not only prevents vibration of the device, but also prevents the device from becoming dislocated with respect to the various parts of the headlight.

In Figs. 6 to 9 of the drawings a slightly different form of the invention is shown. In this form the cup-shaped member is constructed the same as before and is provided with a down-struck tongue 10' having a rearwardly curved lower end 11' and laterally extending wings 12'. The wings 12' instead of being bent inwardly upon themselves are curved rearwardly. The tongue 10' is provided with a central opening 14'. This form of device is intended to be used when the bulb 3 has no long shank. In this case, the bulged portion of the bulb bears against the tongue 10' and holds it in contact with the forward end of the socket 4.

The free end 11' of the tongue 10' bears against the reflector 2, while the free ends of the wings 12' also bear against the reflector so that the device is prevented from vibrating unduly and becoming displaced with respect to the other parts of the headlight.

The upper portion 6 of the device prevents practically all of the light from the bulb 3 from striking the upper part of the reflector 2 and from being projected above a certain line, while the lower section 7 of the device diffuses the light from the bulb 3 before it strikes the lower portion of the reflector, thus causing a natural light to be projected from the headlight and such that persons facing the same will not be blinded.

It will be seen that the device is simple in construction and can be applied to headlights now in use without first specially constructing such headlights for the attachment of the device thereto.

It is obvious that various changes in form, proportion, and in the minor details of construction, may be resorted to without departing from the spirit of the invention as set forth in the appended claims.

What is claimed is:

1. A device of the character described insertible in a reflector of a headlight and comprising a hollow member to receive the bulb of the headlight, a tongue united with said hollow member and extending across the rear end thereof and provided with an opening to receive the shank of said bulb, and spring means on said tongue for pressing against said bulb and thereby pressing said tongue against the socket of said bulb.

2. A device of the class described comprising a cup-shaped member, a tongue extending downwardly from the rear edge of the upper portion of said member and across the rear end of the same, and wings extending laterally from opposite edges of said tongue, said tongue being provided with an opening therein for receiving the shank of the bulb of a headlight.

3. A device of the class described comprising a cup-shaped member, a tongue extending downwardly from the rear edge of the upper portion of said member and provided with an opening therein adapted to receive the shank of the bulb of a headlight, wings extending laterally from opposite edges of said tongue and having their free ends bent inwardly upon themselves and provided with opposing recesses forming an opening in alinement with the opening in said tongue.

4. The combination with a headlight having a reflector, an electric light bulb and a socket in which said bulb is fitted, of a cup-shaped member having an upper section of sheet material and a lower section of foraminous material, and a tongue extending downwardly from the rear end of said upper section across the rear end of said member and disposed upon the shank of said bulb, said tongue having spring means thereon for holding said tongue in position between said bulb and said socket.

5. The combination with a headlight having a reflector, an electric light bulb and a socket in which said bulb is removably disposed, of a cup-shaped member surrounding said bulb and having a tongue extending downwardly from the rear end of the upper portion of said member across the rear end of the same, the free end of said tongue bearing against said reflector, wings extending laterally from opposite edges of said tongue, and means carried by said wings for steadying said member.

6. The combination with a headlight having a reflector, an electric light bulb and a socket in which said bulb is removably disposed, of a cup-shaped member surrounding said bulb, a tongue extending downwardly from the rear end of the upper portion of said member across the rear end of the same and provided with an opening receiving the shank of said bulb, said tongue bearing against the forward end of said socket and having its free end bearing against said reflector, wings extending laterally from opposite edges of said tongue, said wings being bent inwardly upon themselves and provided at their free ends with opposing recesses forming an opening alined with the opening in said tongue, the inturned portions of said wings pressing against the rear end of said bulb and coacting therewith to press the tongue against the socket.

In testimony whereof I have hereunto set my hand.

JULIUS SCHIRRA.